United States Patent
Geiger et al.

(10) Patent No.: US 6,434,972 B1
(45) Date of Patent: Aug. 20, 2002

(54) AIR CONDITIONER WITH INTERNAL HEAT EXCHANGER AND METHOD OF MAKING SAME

(75) Inventors: Wolfgang Geiger, Ludwigsburg; Hans-Joachim Krauss, Stuttgart; Michael Sickelmann, Stuttgart; Karl-Heinz Staffa, Stuttgart; Christoph Walter, Stuttgart; Hagen Mittelstrass, Bondorf, all of (DE)

(73) Assignee: Behr GmbH & Co., Stuttgart (DE)

( * ) Notice: Subject to any disclaimer, the term of this patent is extended or adjusted under 35 U.S.C. 154(b) by 38 days.

(21) Appl. No.: 09/665,124

(22) Filed: Sep. 20, 2000

(30) Foreign Application Priority Data

Sep. 20, 1999 (DE) .......................................... 199 44 951

(51) Int. Cl.⁷ .............................................. F25B 41/00
(52) U.S. Cl. ........................... 62/513; 62/113; 165/177; 165/179; 165/184; 165/156
(58) Field of Search ................... 62/513, 113; 165/177, 165/179, 182, 184, 154, 155, 156

(56) References Cited

U.S. PATENT DOCUMENTS

| | | | | |
|---|---|---|---|---|
| 2,120,764 A | * | 6/1938 | Newton | 62/3 |
| 2,756,032 A | | 7/1956 | Dowell | 257/246 |
| 2,797,554 A | * | 7/1957 | Donovan | 62/117.55 |
| 3,446,032 A | * | 5/1969 | Bottum | 62/513 |
| 3,596,474 A | * | 8/1971 | Bloxham et al. | 62/93 |
| 3,887,004 A | | 6/1975 | Beck | 165/179 |
| 3,976,129 A | * | 8/1976 | Silver | 165/154 |
| 4,249,390 A | | 2/1981 | Jones | 62/238 E |
| 4,380,912 A | * | 4/1983 | Edwards | 62/506 |
| 4,936,113 A | * | 6/1990 | Nivens | 62/513 |
| 6,032,482 A | | 3/2000 | Krauss | 62/513 |
| 6,185,957 B1 | * | 2/2001 | Voss et al. | 62/513 |
| 6,298,687 B1 | * | 10/2001 | Dienhart et al. | 62/513 |

FOREIGN PATENT DOCUMENTS

| | | | | |
|---|---|---|---|---|
| DE | 814 159 | 9/1951 | | |
| DE | 1 781 037 | 10/1958 | | |
| DE | 1 129 516 | 5/1962 | | |
| DE | 1 208 314 | 1/1966 | | |
| DE | 33 20 265 | 12/1984 | | |
| DE | 196 24 030 | 12/1997 | | |
| DE | 196 35 454 | 3/1998 | | |
| DE | 197 29 496 | 1/1999 | | |
| GB | 2231142 A | * | 7/1990 | F28D/7/10 |

* cited by examiner

Primary Examiner—Denise L. Esquivel
Assistant Examiner—Marc Norman
(74) Attorney, Agent, or Firm—Crowell & Moring LLP

(57) ABSTRACT

The invention relates to an air conditioner with a refrigerant loop containing a compressor, an evaporator, an accumulator positioned on the low-pressure side between the evaporator and the compressor, and an internal heat exchanger with a high-pressure side heat transfer channel and a low-pressure side heat transfer channel. According to the invention, the internal heat exchanger has a multichannel tube wound into a radial spiral or a meander shape. In addition or alternatively, the internal heat exchanger contains a multichannel tube which is positioned in the air current path of a cool air current of a high-pressure side condenser/gas cooler. Utilization, for example as a $CO_2$ air conditioner in motor vehicles.

26 Claims, 3 Drawing Sheets

AIR CONDITIONER WITH INTERNAL HEAT EXCHANGER AND METHOD OF MAKING SAME

CROSS-REFERENCE TO RELATED APPLICATIONS

This application is related to U.S. patent application Ser. No. 09/496,215, filed Feb. 1, 2000.

BACKGROUND AND SUMMARY OF THE INVENTION

This application claims the priority of German patent document 199 44 951.1 filed Sep. 20, 1999, the disclosure of which is expressly incorporated by reference herein.

The invention concerns an air conditioner with a refrigerant loop which includes an evaporator, a compressor which transfers the refrigerant from a low-pressure side to a high-pressure side, an accumulator positioned between the evaporator and a compressor on the low-pressure side, and an internal heat exchanger having a heat transfer channel on the high-pressure side and a heat transfer channel on the low-pressure side in thermal contact with same.

These types of air conditioners are particularly used in motor vehicles, e.g. in the form of $CO_2$ air conditioners. The internal heat exchanger serves to transfer heat from the refrigerant on the high-pressure side to the refrigerant on the low-pressure side, whereby the so-called coefficient of performance, i.e., the ratio of refrigeration capacity and input power of the air conditioner, is significantly increased.

An air conditioner of this type is disclosed in the German disclosure document DE 196 35 454 A1. The internal heat exchanger is integrated herein with the accumulator into a modular unit in that it is housed inside an accumulator housing, e.g. in the form of a flat tube spiral with the windings separated from one another.

Furthermore, using a coaxial tube with two lengthwise fluid-separated tube channels in thermal contact as an internal heat exchanger for an air conditioner in order to undercool the high-pressure side refrigerant before an expansion valve through heat transfer to the low-pressure side refrigerant is known. A coaxial tube serving this purpose is described in the German patent specification DE 1 208 314, in which an internal tube is concentrically surrounded by an external tube and is provided with internal lengthwise ribbing to increase the heat transfer surface area. A wire screw can be placed between the external tube and the internal tube in order to lengthen the effective heat transfer flow path. Internal tube designs are also indicated as known herein in which the internal tube is folded into a star shape or in which the internal tube has a sheet metal helix inserted to produce a twisting flow.

An air conditioner for a motor vehicle is also known in which an internal heat exchanger is combined with an evaporator and an expansion valve into an integral modular unit. This type of combination of the internal heat exchanger on or into the evaporator is, however, frequently connected with a relatively high overall space requirement, which can lead to problems, particularly in the confined installation conditions of motor vehicles.

An integrated accumulator-heat exchanger modular unit was disclosed in the prior German patent application No. 199 03 833.3 (not previously published), in which the internal heat exchanger is formed by a spiral coaxial tube accommodated in the condenser housing.

The invention has as its basis the technical problem of the provision of an air conditioner with an internal heat exchanger of the type described initially which is relatively simple to produce and requires relatively little additional overall space for a predetermined heat transfer performance.

Certain preferred embodiments of the invention solve this problem by the provision of an air conditioner of the above noted type, wherein the internal heat exchanger contains a multichannel tube wound into one of a radial spiral and a meander shape.

Certain preferred embodiments of the invention further solve this problem by positioning turbulence elements on ridges, or providing spiral ridges between concentric coaxial multichannel tubes.

In certain preferred embodiments, the air conditioner has an internal heat exchanger which contains a multichannel tube which is wound into a radial spiral or meander shape. The necessary overall length can thereby be kept significantly smaller than the effective heat transfer flow path length, whereby only one single (multichannel) tube must be bent.

In an air conditioner further developed according to certain preferred embodiments, the multichannel tube is formed, in a way advantageous for production engineering, from a coaxial tube comprising either an extruded internal tube with external ridges inserted in an external tube, an extruded external tube with internal ridges into which an internal tube is inserted, or a one-piece extruded tube with integrated ridges between the internal and external tubes. The ridges are preferably spiraled, in order to make the flow path length for the relevant heat transfer channel longer than the overall length of the coaxial tube.

In a further development of certain preferred embodiments, turbulence elements are provided on the ridges, or the ridges are spiral-shaped. This contributes to a further intensifying of the heat transfer. The turbulence elements could, for example, be formed by slits in the ridges or by tailored projections on the ridges.

In the air conditioner according to certain preferred embodiments of the invention, the internal heat exchanger contains a multichannel tube positioned in the air current path of an air current used to cool the condenser/gas cooler and thereby supplements the cooling of the internal heat exchanger, increasing the undercooling of the refrigerant on the low-pressure side and thereby the degree of effectiveness of the entire air conditioner.

Other objects, advantages and novel features of the present invention will become apparent from the following detailed description of the invention when considered in conjunction with the accompanying drawings.

DETAILED DESCRIPTION OF THE DRAWINGS

Figure 1:
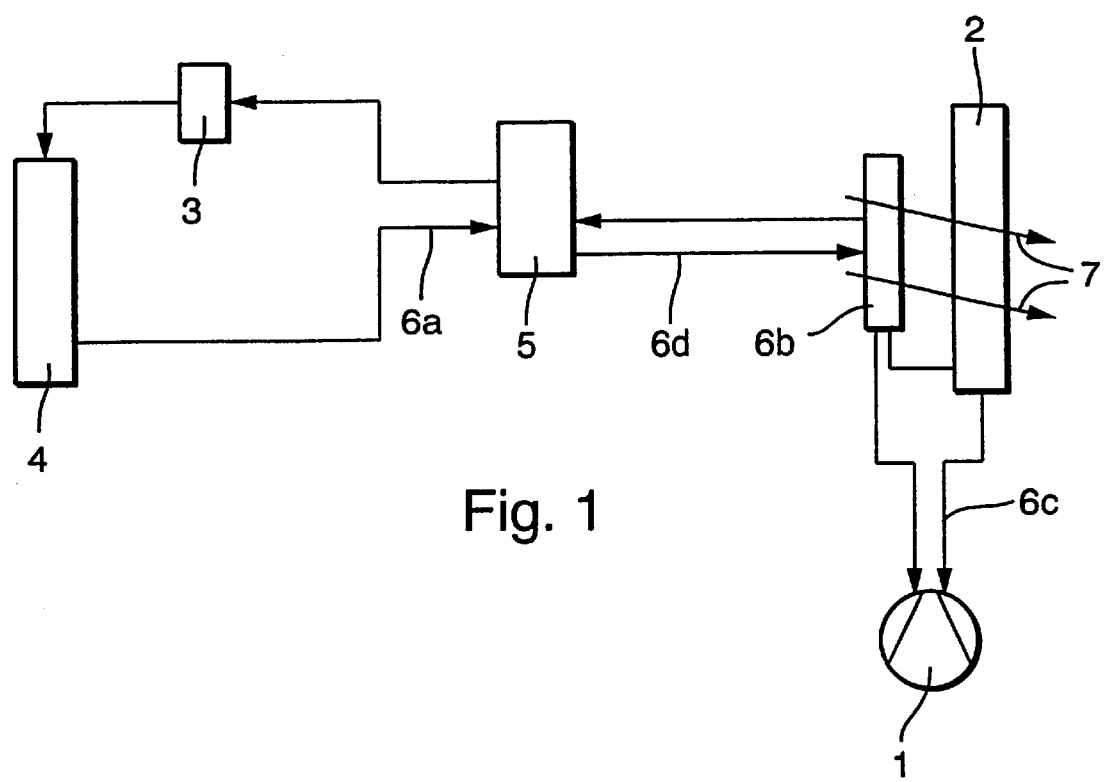
FIG. 1 is a block diagram of an air conditioner with a refrigerant loop with an internal heat exchanger, constructed according to preferred embodiments of the invention.

FIG. 1 shows a block diagram schematic of the construction of an air conditioner as it is usable, for example, in a motor vehicle. In the associated refrigerant loop there is, as is typical, a compressor 1, a high-pressure side condenser 2 attached to same, which, for example, in the case in which $CO_2$ is used as a refrigerant, would generally better be called a gas cooler, an expansion valve 3 downstream from said condenser, an evaporator 4 attached to said expansion valve in the refrigerant flow direction, and an accumulator 5 positioned between the evaporator 4 and the compressor 1 on the low-pressure side. Insofar as the high-pressure side refrigerant line and the low-pressure side refrigerant line in FIG. 1 are depicted as closely neighboring lines, depending on the application one or more of these loop sections could be realized by a multichannel tube forming an internal heat exchanger.

The internal heat exchanger thus comprises a first section 6a forming at least a part of the low-pressure side refrigerant line from the evaporator 4 to the accumulator 5, and/or a second section 6b forming at least a part of the low-pressure side refrigerant line from the accumulator 5 to the compressor 1 and, like the first section 6a, at least a part of the high-pressure side refrigerant line from the condenser/gas cooler 2 to the expansion valve 3, and/or a third section 6c forming at least a part of the high-pressure side refrigerant line from the compressor 1 to the condenser/gas cooler 2 and, like the second section 6b, at least a part of the low-pressure side refrigerant line from the accumulator 5 to the compressor 1, and/or a fourth section 6d between the second section 6b and the accumulator 5. Depending on the application, all four sections 6a to 6d or only one or a desired combination of two or three of the sections 6a to 6d could be used to form the internal heat exchanger in the corresponding air conditioner variation.

The second internal heat exchanger section 6b is characterized in that it lies in the air current path of an air current 7, which serves to cool the condenser/gas cooler 2 and thus also cools this internal heat exchanger section 6b. This additional cooling of the internal heat exchanger has as a consequence an improvement in the undercooling of the low-pressure side refrigerant and thereby an improvement of the degree of effectiveness of the air conditioner as a whole. For this purpose, it is preferable if the second internal heat exchanger section 6b is positioned as shown in the space in front of the condenser/gas cooler 2 or, alternatively, at the side of same.

Figure 2:
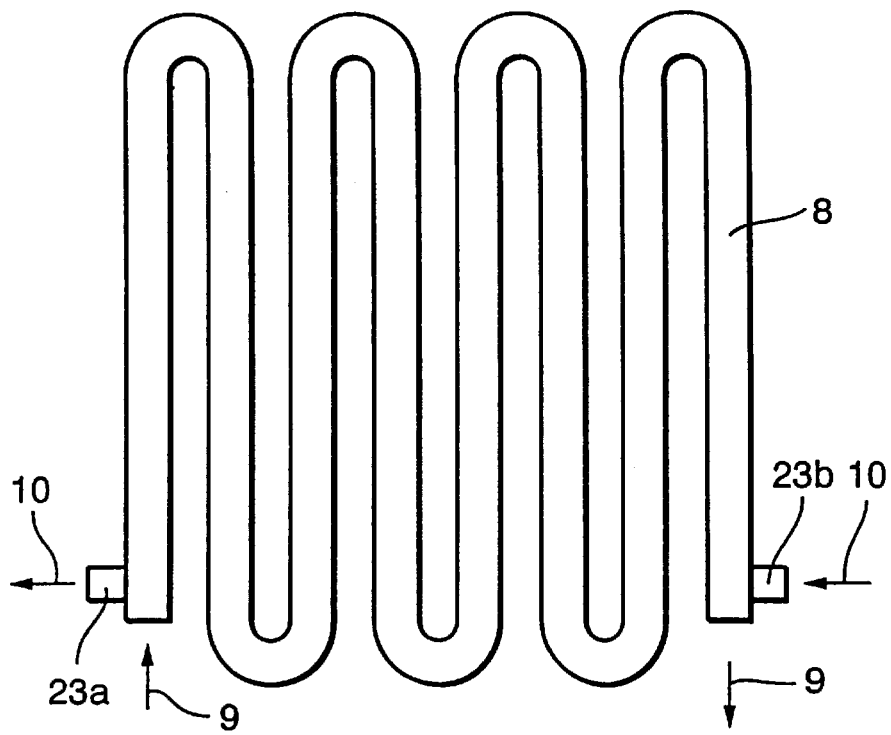
FIG. 2 is a side view of an internal heat exchanger section in the form of a meander-shaped coaxial tube, constructed according to certain preferred embodiments of the invention.

FIG. 2 shows a meander-shaped wound coaxial tube 8 which is usable for each of the four internal heat exchanger sections 6a to 6d and, in particular, for the air-cooled second internal heat exchanger section 6b. The coaxial tube 8 contains an internal tube whose interior space forms a first heat transfer channel, and an external tube, whereby the annular space between the internal and external tube forms a second heat transfer channel. Of the two heat transfer channels, one functions as a high-pressure side refrigerant loop section and the other functions as a low-pressure side refrigerant loop section. The low-pressure side refrigerant preferably flows through the external annular space, and the high-pressure side refrigerant preferably flows through the internal channel, however, an inverse assignment is also possible. The high-pressure side and low-pressure side refrigerants are preferably guided in opposite directions through the coaxial tube 8, but alternatively can be guided in a parallel flow. The internally guided refrigerant 9 is hereby supplied and drained from the end face, while the externally guided refrigerant 10 is supplied and removed via the respective radial connecting branches 23a and 23b. For this purpose, the radial connecting branches 23a and 23b discharge into the external annular space of the coaxial tube 8, which is closed on its end face, while the interior channel surrounded by the internal tube is open on its end face.

Figure 3:
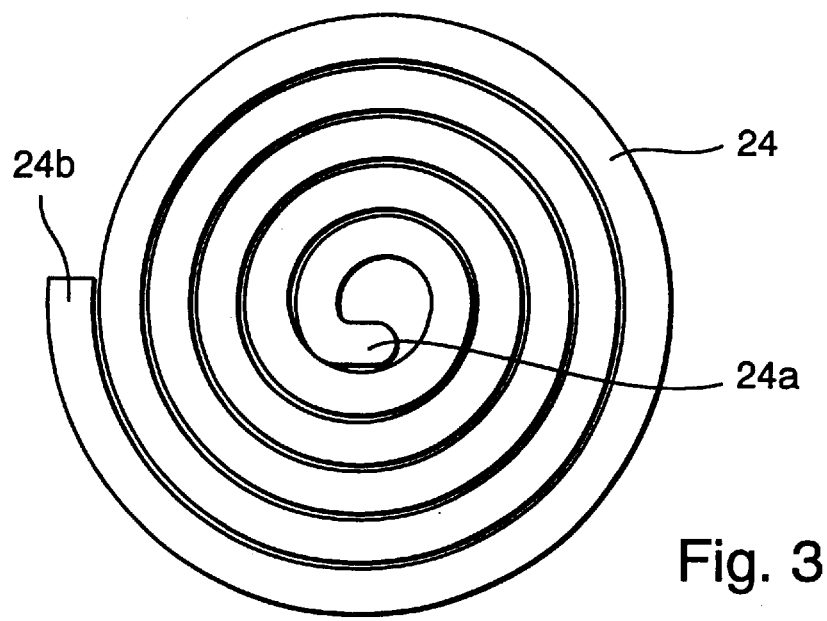
FIG. 3 is a top view of an internal heat exchanger section in the form of a spiral-shaped coaxial tube, constructed according to certain preferred embodiments of the invention.
Figure 4:
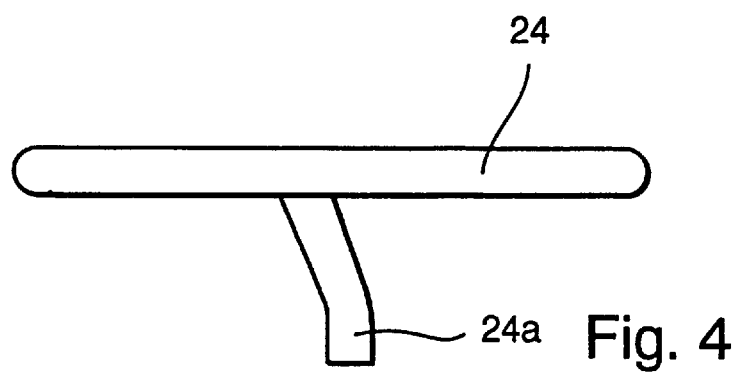
FIG. 4 is a side view of the spiral-shaped coaxial tube of FIG. 3.

In FIGS. 3 and 4, a further realization possibility is depicted for each of the internal heat exchanger sections 6a to 6d of the air conditioner of FIG. 1, and particularly for the second internal heat exchanger section 6b. In this case, the corresponding internal heat exchanger section consists of a coaxial tube spiral 24, which extends from an inner end 24a out to an outer end 24b as a radial spiral. At the inner end 24a it is, as can be seen in FIG. 4, bent out of the spiral plane to form a coaxial tube connecting branch. The supply and removal of the high-pressure side refrigerant on one side and the low-pressure side refrigerant on the other side to and from the associated internal heat transfer channel and/or to and from the annular external heat transfer channel can occur in a way that is not shown through a connection configuration corresponding to FIG. 2 or any other typical coaxial tube connection configuration desired. In both FIGS. 2 and 3, a joint connection flange can also be provided at which all four connections, i.e. both intakes and both outlets, can be brought together, which simplifies the connection of the coaxial tube. The spiral can be coiled as necessary so that its windings lie on top of one another or so that a separation remains between each of the neighboring windings, through which, for example, an air current could be guided.

Figure 5:
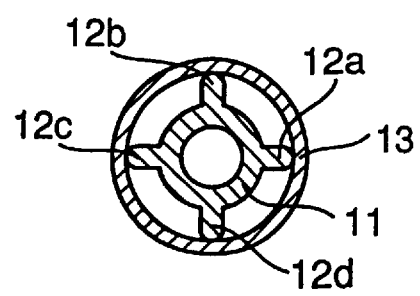
FIGS. 5 to 9 are cross-sectional views of various coaxial tubes usable for the internal heat exchanger, constructed according to certain preferred embodiments of the invention.

FIGS. 5 to 9 show cross-sectional views of various possibilities for realization of coaxial tubes for the different sections of the internal heat exchanger of the air conditioner of FIG. 1. Specifically, FIG. 5 illustrates an internal heat exchanger in the form of a coaxial tube, which consists of an extruded internal tube 11 with four externally formed spiral lengthwise ridges 12a, 12b, 12c, 12d in equidistant angular separation which is inserted into an associated external tube 13.

Figure 6:
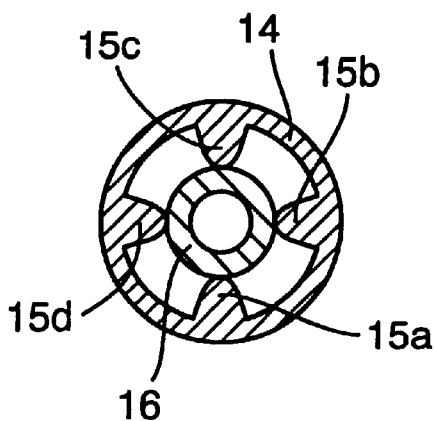

In the exemplary embodiment of FIG. 6, the coaxial tube for the internal heat exchanger consists of an extruded external tube 14, on whose internal side four spiral lengthwise ridges 15a to 15d are formed in equidistant angular separation and into which an associated internal tube 16 is inserted.

Figure 7:
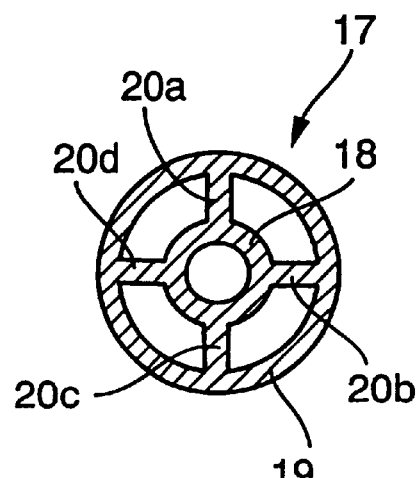

FIG. 7 shows a coaxial tube 17 usable as an internal heat exchanger manufactured extruded as a one-piece component, whereby an internal tube section 18 and external tube section 19 are connected to one another via four spiral-shaped lengthwise ridges 20a to 20d positioned in equidistant angular separation.

In all three examples of FIGS. 5 to 7, the spiral-shaped course of the lengthwise ridge can be produced through appropriate twisting during the extrusion manufacturing process, around the lengthwise axis of the internal tube 11 in the case of FIG. 5, the lengthwise axis of the external tube 14 in the case of FIG. 6, and/or the lengthwise axis of the entire coaxial tube 17 in the case of FIG. 7, whereby the pitch of the spiral can be variably adjusted as desired. The annular space between the external and internal tube sections is divided into individual channels with equal cross-sections of flow by the selection of the equidistant angular separations of the ridges.

Figure 8:
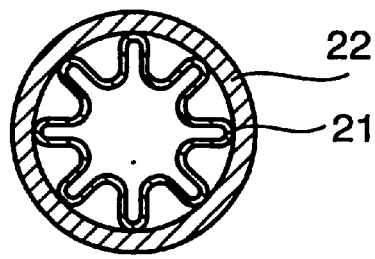

FIG. 8 shows a coaxial tube design for the internal heat exchanger in which an internal tube 21 with a rounded star-shaped tube wall cross-section is inserted into an external tube 22.

Figure 9:
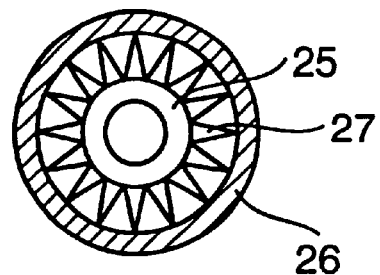

In the exemplary embodiment of FIG. 9, the coaxial tube for the internal heat exchanger consists of an internal tube 25, an external tube 26, and a finned profile 27 inserted between the internal tube 25 and external tube 26.

In all the examples of FIGS. 5 to 9, the respective coaxial tubes contain a one-piece internal lengthwise tube channel formed by the internal tube and a composite external lengthwise tube channel formed by the space between the internal tube and the external tube, which is divided by the ridges and/or the internal tube wall profile or the finned profile into several external lengthwise channels. A spiral-shaped course of the separating elements between the individual external lengthwise channels lengthens the flow path for the refrigerant guided through them in relation to the length of the tube and thereby intensifies the thermal contact between this refrigerant flow and the refrigerant flow through the internal tube. To further intensify the thermal contact, turbulence elements can be positioned on the separating elements, e.g. in the form of slits in the separating elements or projections formed on the separating elements. Thus, in the exemplary embodiments of FIGS. 5 to 7, these types of turbulence projections could be placed axially on the four ridges and thereby project from one side of the ridge into the adjacent fluid flow space. In addition, as described for FIGS. 2 to 4 above, the coaxial tube as a whole can be partially or completely bent in a meander or spiral shape in order to reduce its overall length and thereby make it easier to insert in constricted spaces.

Due to the realization of the internal heat exchanger as a multichannel tube, only one single multichannel tube has to be bent in order to achieve a correspondingly bent space-saving flow guide for the high-pressure side heat transfer channel of the internal heat exchanger as well as for the low-pressure side heat transfer channel. The shape of the tube can thereby be tailored to the contour of a component to which it is to be attached, e.g. the contour of the engine hood of a motor vehicle, so that it can be correspondingly installed in a space-saving way.

In addition to the embodiments shown in FIGS. 5 to 9, further multichannel tube designs are contemplated, e.g. those in which several individual tube channels are present for both the high-pressure side and low-pressure side refrigerants, which, in addition, do not necessarily have to be coaxial, but could, for example, also be positioned alternately lying side by side.

Instead of the high-pressure side and low-pressure side refrigerants in the internal heat exchanger sections 6a, 6b, 6c being guided as indicated with arrows in FIG. 1, they can alternatively be guided into parallel streams for all or only a part of the internal heat exchanger sections 6a, 6b, 6c.

The realizations described in detail above show that by means of the invention an air conditioner can be provided having an internal heat exchanger which increases effectiveness and requires relatively little installation space hereby, in that the internal heat exchanger is formed by a coaxial tube which is bent into a meander or spiral shape, so that the active heat transfer flow path for the high-pressure side and low-pressure side refrigerant is lengthened in relation to the length of the coaxial tube component.

The invention is particularly applicable for $CO_2$ air conditioners of motor vehicles. It is particularly advantageous to position at least one part of the entire internal heat exchanger in the cool air current of the condenser/gas cooler in order to thereby additionally cool the internal heat exchanger with the air current and thus achieve a better undercooling of the low-pressure side refrigerant and increase the overall degree of effectiveness of the air conditioner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air conditioner with a refrigerant loop comprising:
    a compressor which transfers refrigerant from a low-pressure side to a high-pressure side,
    an evaporator,
    a low-pressure side accumulator positioned between the evaporator and the compressor, and
    an internal heat exchanger with a high-pressure side heat transfer channel and a low-pressure side heat transfer channel in thermal contact with same,
    wherein the internal heat exchanger contains a multichannel tube wound into one of a radial spiral and a meander shape, and
    wherein the multichannel tube is positioned in an air current path of a cool air current of a high-pressure side condenser/gas cooler of the air conditioner.

2. Air conditioner according to claim 1, wherein the multichannel tube is a coaxial tube formed by an external tube and an extruded internal tube with external ridges on the internal tube.

3. Air conditioner according to claim 1, wherein the multichannel tube is a coaxial tube formed by an extruded external tube with internal ridges with an inserted internal tube.

4. Air conditioner according to claim 1, wherein the multichannel tube is a coaxial tube formed by a one-piece extruded coaxial tube with an internal tube section and an external tube section and with ridges between the internal tube section and the external tube section.

5. Air conditioner according to claim 2, wherein turbulence elements are positioned on the ridges.

6. Air conditioner according to claim 2, wherein the ridges run in a spiral shape.

7. Air conditioner according to claim 3, wherein turbulence elements are positioned on the ridges.

8. Air conditioner according to claim 3, wherein the ridges run in a spiral shape.

9. Air conditioner according to claim 4, wherein turbulence elements are positioned on the ridges.

10. Air conditioner according to claim 4, wherein the ridges run in a spiral shape.

11. Air conditioner according to claim 1, wherein the air conditioner is adapted for use on a motor vehicle.

12. Air conditioner, with a refrigerant loop comprising:
    a compressor which transfers refrigerant from a low-pressure side to a high-pressure side,
    an evaporator,
    a low-pressure side accumulator positioned between the evaporator and the compressor, and
    an internal heat exchanger with a high-pressure side heat transfer channel and a low-pressure side heat transfer channel in thermal contact with same,
    wherein the internal heat exchanger includes a multichannel tube positioned in an air current path of a cool air current of a high-pressure side condenser/gas cooler of the air conditioner.

13. Air conditioner according to claim 12, wherein the multichannel tube is a coaxial tube formed by an external tube and an extruded internal tube with external ridges on the internal tube.

14. Air conditioner according to claim 12, wherein the multichannel tube is a coaxial tube formed by an extruded external tube with internal ridges with an inserted internal tube.

15. Air conditioner according to claim 12, wherein the multichannel tube is a coaxial tube formed by a one-piece extruded coaxial tube with an internal tube section and an external tube section and with ridges between the internal tube section and the external tube section.

16. Air conditioner according to claim 12, wherein the air conditioner is adapted for use on a motor vehicle.

17. A method of making an air conditioner including forming a refrigerant loop comprising:
- a compressor which transfers refrigerant from a low-pressure side to a high-pressure side,
- an evaporator,
- a low-pressure side accumulator positioned between the evaporator and the compressor, and
- an internal heat exchanger with a high-pressure side heat transfer channel and a low-pressure side heat transfer channel in thermal contact with same,
- wherein the internal heat exchanger is formed by winding a multichannel tube in one of a radial spiral and a meander shape.

18. A method according to claim 17, wherein the multichannel tube is a coaxial tube formed by an external tube and an extruded internal tube with external ridges on the internal tube.

19. A method according to claim 17, wherein the multichannel tube is a coaxial tube formed by an extruded external tube with internal ridges with an inserted internal tube.

20. A method according to claim 17, wherein the multichannel tube is a coaxial tube formed by a one-piece extruded coaxial tube with an internal tube section and an external tube section and with ridges between the internal tube section and the external tube section.

21. A method according to claim 17, wherein the air conditioner is adapted for use on a motor vehicle.

22. A method of making an air conditioner including forming a refrigerant loop comprising:
- a compressor which transfers refrigerant from a low-pressure side to a high-pressure side,
- an evaporator,
- a low-pressure side accumulator positioned between the evaporator and the compressor, and
- an internal heat exchanger with a high-pressure side heat transfer channel and a low-pressure side heat transfer channel in thermal contact with same,
- wherein the internal heat exchanger includes a multichannel tube positioned in an air current path of a cool air current of a high-pressure side condenser/gas cooler of the air conditioner.

23. A method according to claim 22, wherein the multichannel tube is a coaxial tube formed by an external tube and an extruded internal tube with external ridges on the internal tube.

24. A method according to claim 22, wherein the multichannel tube is a coaxial tube formed by an extruded external tube with internal ridges with an inserted internal tube.

25. A method according to claim 22, wherein the multichannel tube is a coaxial tube formed by a one-piece extruded coaxial tube with an internal tube section and an external tube section and with ridges between the internal tube section and the external tube section.

26. A method according to claim 22, wherein the air conditioner is adapted for use on a motor vehicle.

* * * * *